(12) United States Patent
Stone

(10) Patent No.: US 8,350,210 B1
(45) Date of Patent: Jan. 8, 2013

(54) EMBEDDED OPTICAL INTERCONNECT DEVICES AND METHODS OF USE THEREOF

(75) Inventor: Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 361 days.

(21) Appl. No.: 12/477,831

(22) Filed: Jun. 3, 2009

Related U.S. Application Data

(60) Provisional application No. 61/058,279, filed on Jun. 3, 2008.

(51) Int. Cl.
*G01J 1/04* (2006.01)
*G02B 6/12* (2006.01)

(52) U.S. Cl. .................. 250/227.11; 385/14

(58) Field of Classification Search ............ 250/227.11, 250/216; 385/14
See application file for complete search history.

(56) References Cited

U.S. PATENT DOCUMENTS

| | | | |
|---|---|---|---|
| 5,245,680 A * | 9/1993 | Sauter | 385/24 |
| 6,055,099 A * | 4/2000 | Webb | 359/435 |
| 6,422,761 B1 | 7/2002 | Naghski et al. | |
| 6,477,286 B1 * | 11/2002 | Ouchi | 385/14 |
| 7,015,454 B2 | 3/2006 | Stone | |
| 7,446,298 B1 | 11/2008 | Stone | |
| 2002/0141163 A1 | 10/2002 | Parker, Jr. | |
| 2004/0206988 A1 | 10/2004 | Glebov | |
| 2004/0264838 A1 * | 12/2004 | Uchida et al. | 385/14 |
| 2006/0239605 A1 * | 10/2006 | Palen et al. | 385/14 |
| 2007/0217750 A1 * | 9/2007 | Budd et al. | 385/89 |

FOREIGN PATENT DOCUMENTS

WO 2009096918 A1 8/2009

OTHER PUBLICATIONS

Chen, et al. "Fully Embedded Board-Level Guided-Wave Optoelectronic Interconnects." Proceedings of the IEEE, vol. 88, No. 6, Jun. 2000.

* cited by examiner

*Primary Examiner* — Thanh Luu
(74) *Attorney, Agent, or Firm* — Burns & Levinson, LLP; Jacob N. Erlich, Esq.; Orlando Lopez, Esq.

(57) ABSTRACT

In one instance, an optical interconnection is embedded in a structure. The optical interconnection embedded in the structure enables interfacing electrical subsystems and sharing electrical signals across the structure by converting electrical signals into optical and vice a versa by means of the optical data pipe technology. The system of these teachings enables methods for decreasing the weight and size of the system, for decreasing sensitivity to electromagnetic interference and for obtaining data from the interior of a system.

3 Claims, 9 Drawing Sheets

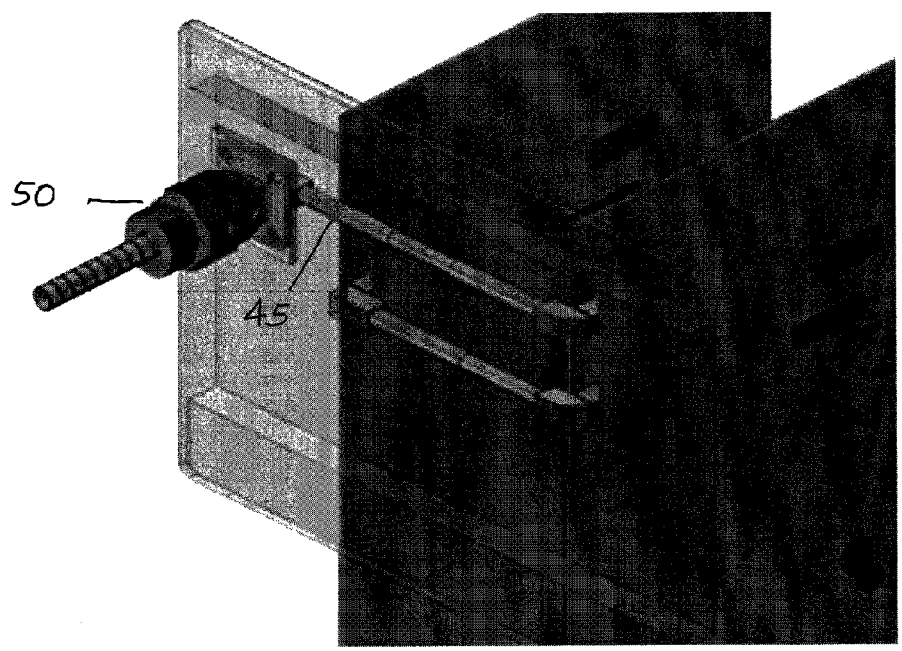
Figure 3. Embedded Fiber Array Board Interface Optical Interconnect Configuration.

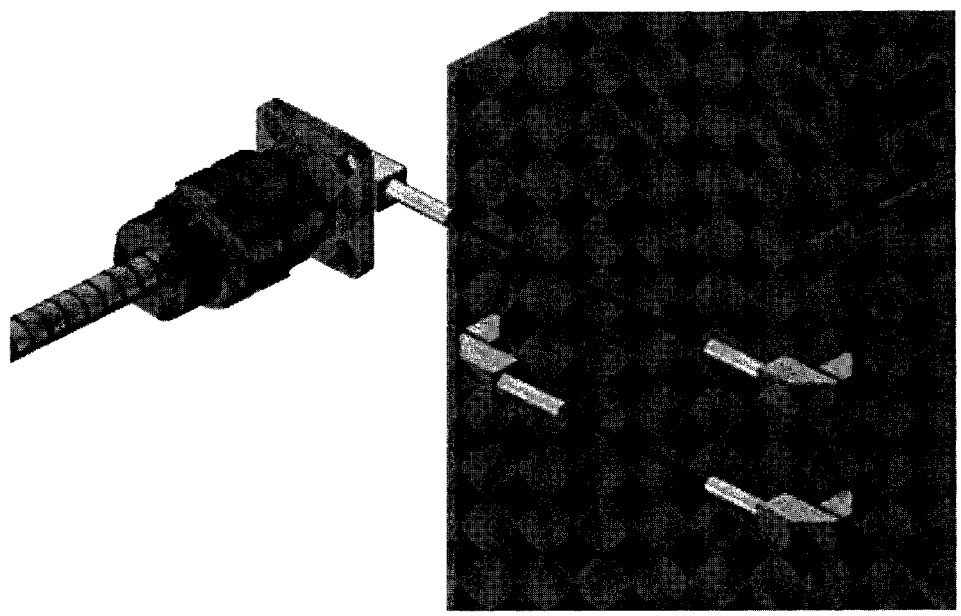
Figure 4. Embedded Fiber Array Board Interface Technology.

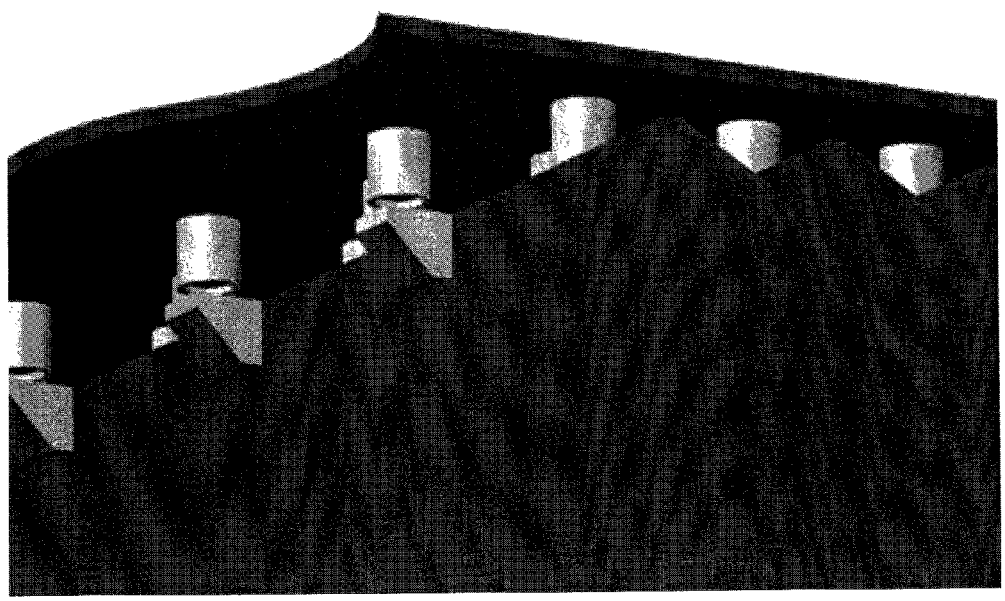
Figure 5. Embedded Optical Interconnect in a Backplane.

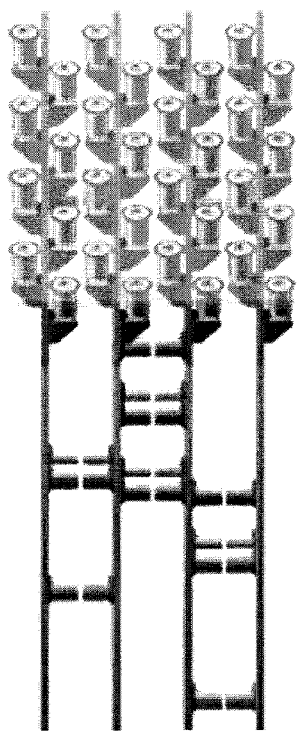
Figure 6. Embedded Optical Backplane Interconnect.

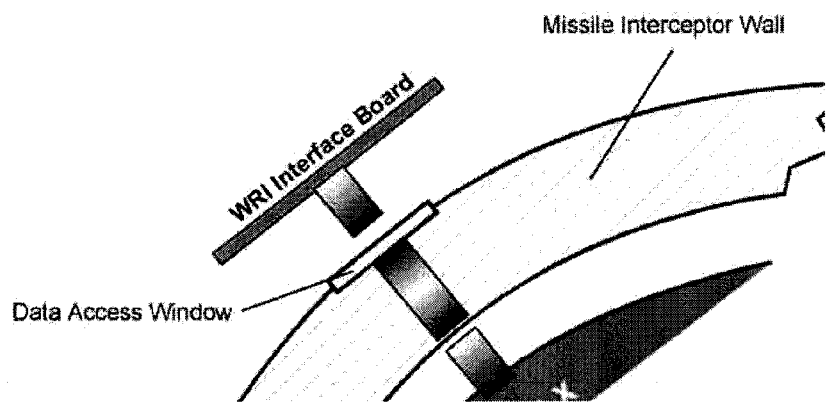
Figure 7. Embedded Optical Relay Interconnect.

EMBEDDED OPTICAL INTERCONNECT DEVICES AND METHODS OF USE THEREOF

CROSS REFERENCE TO RELATED APPLICATIONS

This application claims priority to U.S. Provisional Application Ser. No. 61/058,279 filed Jun. 3, 2008, entitled EMBEDDED OPTICAL INTERCONNECT DEVICES, which is incorporated herein by reference in its entirety.

STATEMENT REGARDING FEDERALLY SPONSORED RESEARCH OR DEVELOPMENT

This invention was made in part with U.S. Government support from the U.S. Air Force under contract #F30602-03-C-0213 and from the U.S. Air Force under contract #FA8750-04-C-0250 and from the U.S. Air Force under contract #F33615-03-M-3337 and from the U.S. Air Force under contract #FA8650-04-C-3414. The U.S. Government has certain rights in the invention.

BACKGROUND

These teachings relate generally to alignment tolerant optical interconnects and, more particularly, to embeddable optical interconnect devices.

The optical data pipe technology is described in detail in U.S. Pat. No. 7,015,454, incorporated by reference herein in its entirety, and related cases.

In one embodiment of the optical interconnect system or optical data pipe approach of U.S. Pat. No. 7,015,454, mating emitter and detector arrays are pre-aligned and fixed on or near the ends of a gradient index rod imager, and this flexible pre-aligned structure is then mounted to the host. In another embodiment infinite conjugate imagers are used to produce Optical Data Pipe modules that are useful for interconnecting chips, boards, backplanes, etc. with generous alignment tolerances in all degrees of freedom. Using these technologies hundreds or thousands of high bandwidth channels can be interconnected for short distances (intra-die, between neighboring chips or MCMS), board to board, board to backplane, or over relatively long distances (full board wrap-around, board-to-board, computer to peripheral, computer to computer, etc.). The optical interconnect system of U.S. Pat. No. 7,015,454 provides a nearly lossless one-to-one optical interconnection from a set of input channels to a set of output channels, and supports extreme density, low power, and low crosstalk for high bandwidth signals. Although the optical interconnect system of U.S. Pat. No. 7,015,454 provides significant advantages, many systems required an enhanced decrease in weight and size beyond that obtained by optical data pipes mounted on circuit boards.

SUMMARY

The objects set forth above as well as further and other objects and advantages of the present teachings are achieved by the embodiments of the teachings described herein below.

In one instance, an optical interconnection is embedded in a structure. The optical interconnection embedded in the structure enables interfacing electrical subsystems and sharing electrical signals across the structure by converting electrical signals into optical and vice versa by means of the optical data pipe technology. In one embodiment, the optical interconnection includes a first angled imager at least partially embedded in the structure, the first angled imager providing a connection to the exterior of the structure, an optical subsystem embedded in the structure, the optical subsystem receiving a number of optical channels from the first angled imager, and a second angled imager receiving electromagnetic radiation from the optical subsystem. In other embodiments, an optical data pipe provides electromagnetic radiation to the first angled imager.

In a further embodiment, an optical data pipe provides an angular spectrum of plane waves of electromagnetic radiation to an optical subsystem embedded in a structure, the optical subsystem connecting an aperture on exterior surface of the structure to the interior of a system.

Embodiments of the system of these teachings enable methods for decreasing the weight and size of the system, for decreasing sensitivity to electromagnetic interference and for obtaining data from the interior of a system.

The present teachings relate to improved forms of optical interconnect devices that are embeddable into chasses, structure walls, interfaces, etc. In large part the present teachings improve upon Optical Data Pipe technology. The Optical Data Pipe technology is described in detail in U.S. Pat. No. 7,015,454, incorporated by reference herein in its entirety, and related cases.

For a better understanding of the present teachings, together with other and further objects thereof, reference is made to the following description taken in conjunction with the accompanying drawings, and its scope will be pointed out in the appended claims.

DETAILED DESCRIPTION OF THE DRAWINGS

FIG. 3 is a 3-D representation of an embedded fiber array board interface optical interconnect configuration of an embodiment of the system of these teachings;

FIG. 4 is a 3-D representation of an embedded fiber array board interface of an embodiment of the system of these teachings;

FIGS. 5-6 are 3-D representations of an embedded optical interconnect in a backplane of embodiments of the system of these teachings; and FIG. 7 is a schematic of an embedded optical relay interconnect of an embodiment of the system of these teachings.

DETAILED DESCRIPTION

An optical interconnect system having one or more optical sub-systems, the one or more optical sub-systems having a first end and a second end, and further having preselected dimensions and optical properties and components emitting electromagnetic radiation and/or components receiving emitted electromagnetic radiation fixedly secured to the first and second ends of the one or more optical sub-systems is disclosed in U.S. Pat. No. 7,015,454 and in U.S. Pat. No. 7,446,298, both of which are incorporated by reference herein in their entirety (such optical interconnect systems are also hereinafter referred to as optical data pipes).

Figure 1A:
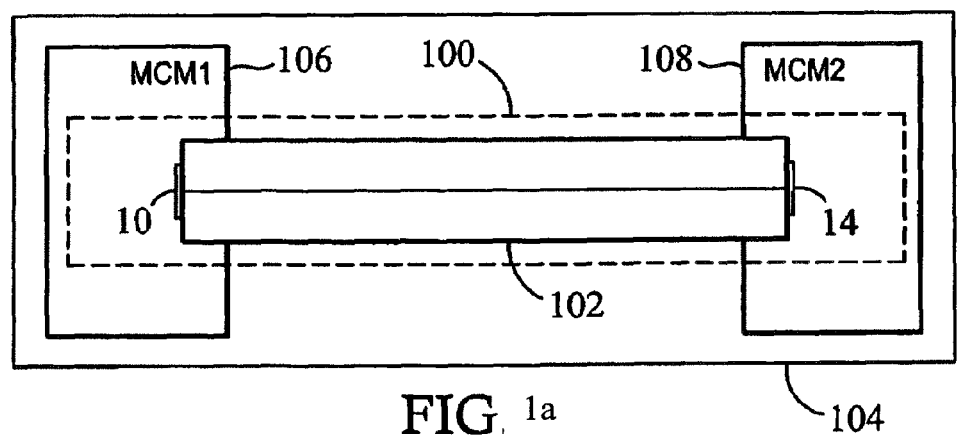
FIG. 1a is a schematic graphical representation of an embodiment of an optical data pipe (ODP)

An embodiment of an optical data pipe 100 is illustrated in FIG. 1a, where the term optical data pipe may also be referred to herein on occasion as optical interconnect 100. Mating interconnection planes 10 and 14 are affixed to the ends of an optical subsystem (in one instance, not a limitation of these teachings, a gradient index (GRIN) rod imager) 102, and this flexible pre-aligned structure is then mounted to the components 106 and 108 of host 104 which provides dense interconnection. The device array or interconnection planes 10 and 14 can contain emitters, detectors, or general optical channel ports such as arrays of free-space channels or guided wave (fiber) channels, or the like. Embodiments utilizing more than one optical subsystem are disclosed in U.S. Pat. No. 7,015,454 and in U.S. Pat. No. 7,446,298. Interconnection between boards can be accomplished, in some instances, using right angle optical data pipe modules.

Figure 1B:
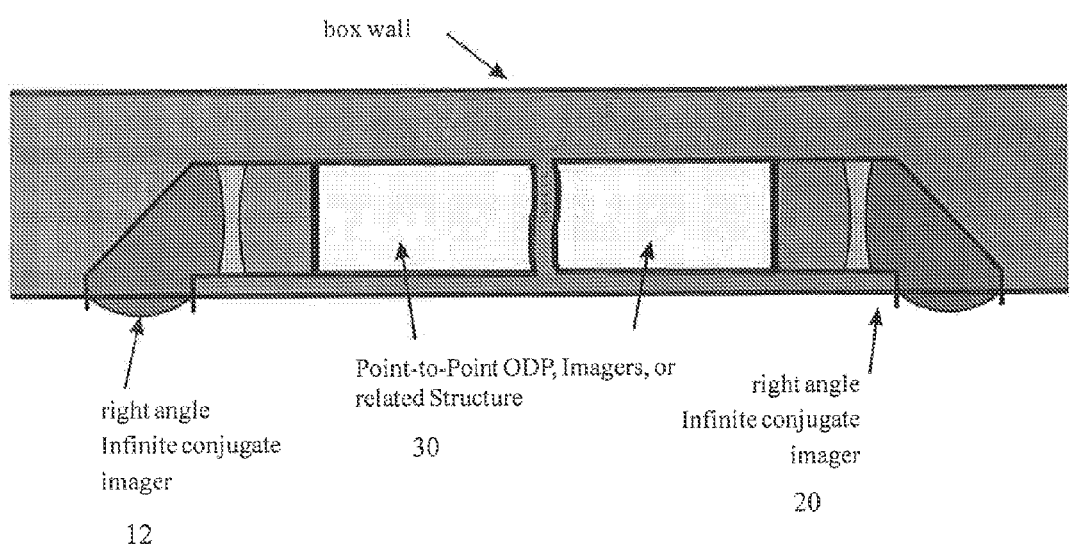
FIG. 1b is a schematic of an embedded optical data pipe interconnect of an embodiment of the system of these teachings.

One embodiment of the present teachings is illustrated in FIG. 1b. In this embedded optical interconnect the optical data pipe interconnect is embedded in the box, chassis or structure wall.

Figure 1C:
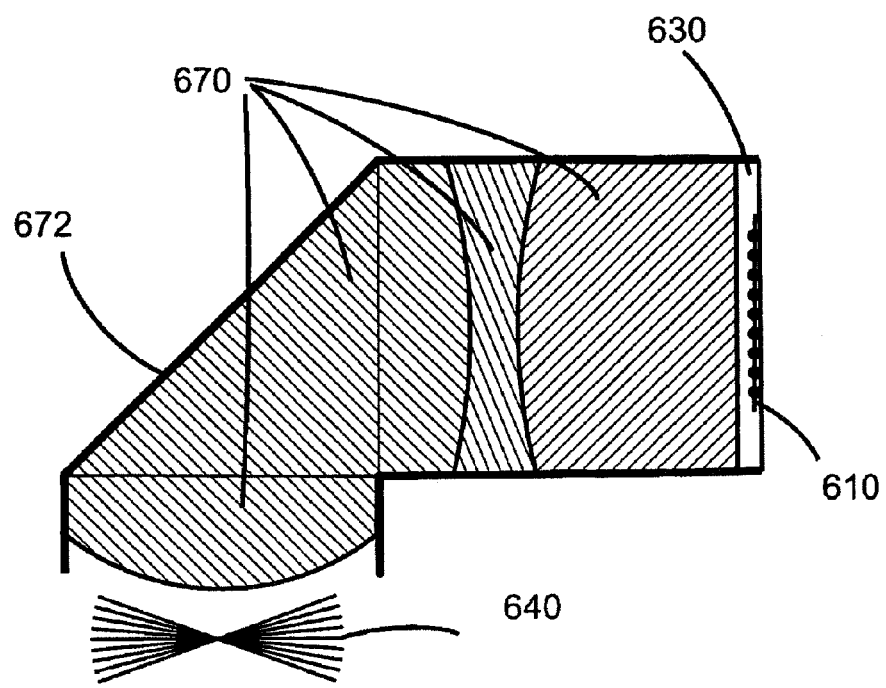
FIG. 1c is a schematic graphical representation of an embodiment of an angled optical data pipe (ODP)

In the configuration of FIG. 1b, a right angle infinite conjugate imager (left) 12 is embedded in the structure wall. This imager can be connected directly (or indirectly) to another right angle imager 20 (right) which is also embedded in the structure wall. The second imager can image out of the same side of the structure wall as shown or it may be rotated, for example by 180°, to image out of the opposite side of the structure wall, or to some intermediate angle to image out of the wall at a different angle. For such rotationally embedded configurations, the component optoelectronic device arrays containing emitters and or detectors can be rotated to provide corresponding channel-to-channel interconnection in the rotationally embedded configurations. These two infinite conjugate imagers may be directly connected for short separations or may be interconnected inside the wall with additional infinite or finite conjugate imagers or Optical Data Pipes, as shown for example in FIG. 1b. In the configuration shown in FIG. 1b, the infinite conjugate imager at left accepts an array of optical channels in the form of substantially an angular spectrum of plane waves (for example from a mating optical data pipe device, an example being shown in FIG. 1c; referring to FIG. 1c, the optical path is folded using a reflective surface 672 that is incorporated into the optical elements 670 of the infinite conjugate imaging system; the optical channel array 610, which may consist, for example, of an optoelectronic die, is pre-aligned and fixed to the infinite conjugate imaging elements 670 by adhesive or fixture 630). This first right angle infinite conjugate imager is separated from the second right angle infinite conjugate imager by one or more optional finite conjugate (point-to-point) imager 30 consisting, for example, of a long gradient index rod lens (shown schematically with a break in the middle to represent the length). This long rod lens finite conjugate imager 30 relays the point source optical channels at the left end to an image array of point source optical channels at the right end. This latter imaged array of point sources at the right end constitutes a group of optical channels, which are then converted into an angular spectrum plane waves by the right angle infinite conjugate imager shown at right. In other configurations the right angle infinite conjugate imagers may be replaced by right angle finite conjugate imagers. The use of right angle bends is for application convenience and these bends may be eliminated or augmented to support the desired geometry and embedded length. The structure wall may be conductive or nonconductive as required for electromagnetic shielding effects. For example, if the structure wall is a conductive polymer or composite, there can be a large isolation of electromagnetic energy from one end to the other of the embedded optical interconnect. In such a case the embedded optical interconnect, if it is not conducting, acts as a waveguide beyond cutoff for and heavily attenuates electromagnetic interference energy of wavelengths similar to and larger than the cross-sectional diameters of the embedded ODP components. It should be noted that, although the above embodiment is described in terms of right angle imagers, other angle imagers (e.g., 30 or 60 degrees) can also be utilized and are within the scope of these teachings.

Figure 2:
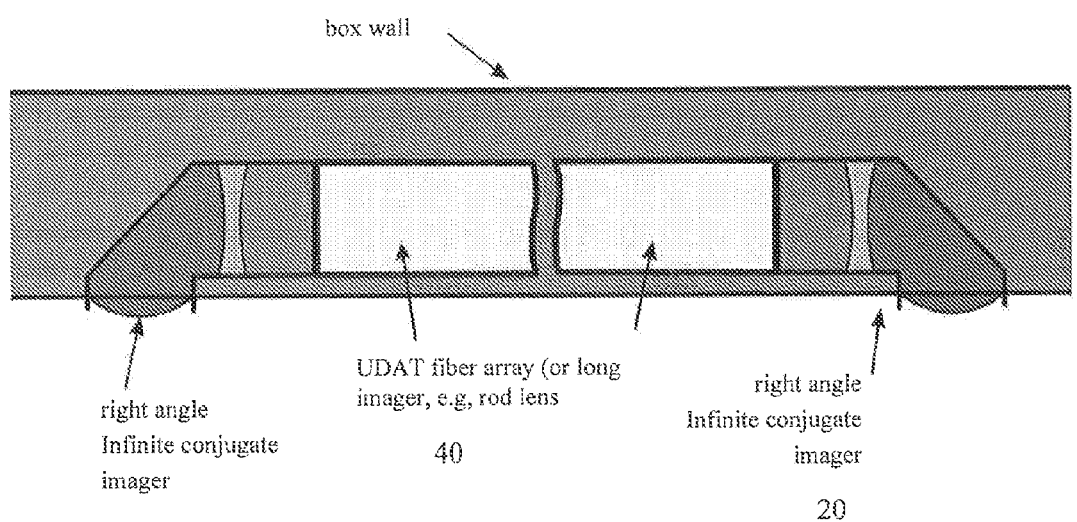
FIG. 2 is a schematic of an embedded ODP with UDAT fiber bundle of an embodiment of the system of these teachings.

In a second embodiment of the present teachings shown in FIG. 2, the two right angle infinite conjugate imagers are separated by a UDAT (Ultra Dense Alignment Tolerant) fiber array 40 consisting of a closely packed array of optical fibers, which match the array of point source optical channels imaged by each of the right angle infinite conjugate imagers. Details of the UDAT fiber array technology are described in U.S. patent application Ser. No. 11/777,170, claiming priority of U.S. Provisional Application No. 60/830,294 filed Jul. 12, 2006, entitled OPTICAL INTERCONNECT AND CONNECTOR DEVICES, both of which are incorporated by reference herein in their entirety.

One advantage of this approach is that once the optical channels are in a UDAT fiber bundle they can be routed inside the chassis simply by incorporating the flexible bundle without length and geometry constraints. The UDAT fiber bundle can be encased in a tube or shield to prevent pressures (for example, in forming a composite wall) and deflections from affecting the fiber bundle. In alternate configurations, the embedded fiber array can be replaced by an array of embedded waveguides.

The embodiment of the present teachings shown in FIG. 2 can be used to implement a fiber array Board interface as shown in FIG. 3.

In the embodiment of FIG. 3, a UDAT fiber cable 45 is connected to the embedded optical interconnect of the present teachings externally to the box. The embedded optical interconnect of the present teachings is embedded in the box wall (which is shown semitransparent for visibility inside the box). The other end of the embedded optical interconnect interfaces to an optical data pipe 50, mounted on the internal circuit board. Operationally, the exterior UDAT connector maps the array of signals from the fiber array into an angular spectrum of substantially plane waves (or waves of narrow finite angular spread about an angular spectrum of plane waves), which enters the embedded interconnect of the present teachings. The embedded interconnect of the present teachings as shown in FIG. 1 or 2 relays this angular spectrum of plane waves to the inside surface of the box wall. The optical data pipe mounted on the internal circuit board then maps the angular spectrum of plane waves into an array of emitters or detectors on an optoelectronic die. Details of the Fiber Array Board Interface device in general are described in the provisional patent application referenced above. Tens or hundreds of optical channels may be interconnected to the embedded optical data pipe interconnect with a very small cross-section of only millimeters.

A detailed view of the embedded Fiber Array Board Interface is shown in FIG. 4. Here the optional protective casing is removed to expose internal fiber array or infinite conjugate imager.

The embedded optical interconnect embodiments described previously can also be embedded in internal structures such as backplanes. This is illustrated in the embodiments of the present teachings shown in FIGS. 5 and 6.

In the embodiment of the present teachings shown in FIG. 5, the infinite conjugate imagers shown protruding from the backplane (top), map the angular spectrum of plane waves from the right angle data pipes shown on the circuit boards into an optical backplane, which includes buried fibers waveguides or imagers.

The embodiment of the present teachings shown in FIG. 5 is shown again in FIG. 6 with a semitransparent backplane for clarity.

In an alternative embodiment, the optical imagers can interface to conventional or embedded electronic interconnects, which are converted at each end to an angular spectrum of optical plane waves external to the board using optical data pipes and associated technology.

Another embodiment of the present teachings is shown in FIG. 7. In this embodiment of the present teachings an imager is buried in the structure wall of a chassis, box, or system, etc. The embedded optical interconnect images the angular spectrum of plane waves from an optical data pipe on the lower right side of the wall into an angular spectrum of plane waves outside (to the upper left) of the wall, which is incident on an external optical data pipe mounted on another board. This can be used, for example, to probe, interface, download, etc. data, or signals between the sides of a structure, vessel, vehicle, etc. This can be accomplished in this manner through a small optical port embedded in the wall. A hard substantially transparent window, such as sapphire or a diamond coated substrate, can be used as a data access window to protect the embedded optical relay interconnect from abrasion and scratches.

In another variation of the embodiment shown in FIG. 7, the imager embedded in the structure wall can be the infinite conjugate imager of an internal or external ODP.

In one application of this embodiment of the present teachings, diagnostic data from the system processor board can be read without disassembling the system. The diagnostic data can be read in a manner that is less sensitive to electromagnetic interference (EMI), a consideration in many harsh environments. A window of sapphire or other material may be used to protect the tiny optical port as shown in FIG. 7. This optical port will attenuate (shield) penetration of electromagnetic interference with wavelengths on the order of and longer than the diameter of the embedded ODP or relay optic.

The embedded connectors of these teachings enable methods for decreasing weight and size (providing a low connector footprint) of systems and also for decreasing the sensitivity to electromagnetic interference (EMI) of systems. By embedding the optical interconnection between an interior and an exterior of a structure and utilizing the optical interconnection to connect electrical systems exterior and interior to the structure (utilizing an optical data pipe to convert the electrical signals to optical signals, propagate the optical signals through the optical interconnection, and converting the optical signals to electrical signals using another optical data pipe), the weight and size of the system can be reduced. Using the same approach, the sensitivity to EMI of the system can also be reduced.

Although the teachings have been described with respect to various embodiments, it should be realized these teachings is also capable of a wide variety of further and other embodiments within the spirit and scope of the appended claims.

What is claimed is:

1. A system comprising:
    a structure, said structure comprising:
    a first angled imager at least partially embedded in said structure, said first angled imager receiving electromagnetic radiation; said first angled imager receiving an array of optical channels in the form of an angular spectrum of substantially plane waves of electromagnetic radiation; and
    a second angled imager; said second angled imager receiving electromagnetic radiation from said first angled imager; said second angled imager optically connecting said first angled imager to another location exterior to said structure; whereby said first angled imager, and said second angled imager provide an optical interconnect capable of enabling connection between electrical/optical subsystems exterior to said structure;
    an optical subsystem embedded in said structure; said optical subsystem optically disposed between said first angled imager and said second angled imager; said optical subsystem receiving a number of optical channels from said first angled imager; said first angled imager optically connecting a location exterior to said structure to said optical subsystem; said second angled imager receiving electromagnetic radiation from said optical subsystem and providing another angular spectrum of plane waves of electromagnetic radiation;
    wherein said optical subsystem comprises a closely packed array of optical fibers; each of a number of optical fibers in said closely packed array of optical fibers receiving an optical channel from said number of optical channels.

2. The system of claim 1 further comprising:
    another optical subsystem;
    an array of emitters/detectors; said array fixedly attached and optically connected to one end of said another optical subsystem; another end of said another optical subsystem being optically connected to said first angled imager; said another end providing the angular spectrum of substantially plane waves of electromagnetic radiation to said first angled imager.

3. The system of claim 1 wherein said first angled imager comprises an infinite conjugate right-angle imager; and wherein said second angled imager comprises an infinite conjugate right angle imager.

\* \* \* \* \*